(Model.)

O. M. CASSEY.
DOMESTIC STEAMER.

No. 257,552.  Patented May 9, 1882.

Witnesses:
E. B. Stockling
Chas. Flint

Olive M. Cassey
Inventress.
By
Atty.

UNITED STATES PATENT OFFICE.

OLIVE M. CASSEY, OF LEAVENWORTH, KANSAS.

DOMESTIC STEAMER.

SPECIFICATION forming part of Letters Patent No. 257,552, dated May 9, 1882.

Application filed March 21, 1882. (Model.)

*To all whom it may concern:*

Be it known that I, OLIVE M. CASSEY, a citizen of the United States of America, residing at Leavenworth, in the county of Leavenworth and State of Kansas, have invented certain new and useful Improvements in Domestic Steamers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of culinary utensils which are adapted by means of water-holding receptacles, perforated food-receptacles, and additional steam-chambers to boil and bake or steam several different dishes or foods simultaneously; and my invention consists of certain devices and combinations of devices hereinafter fully described, and specifically set forth in the claim.

Figure 1:
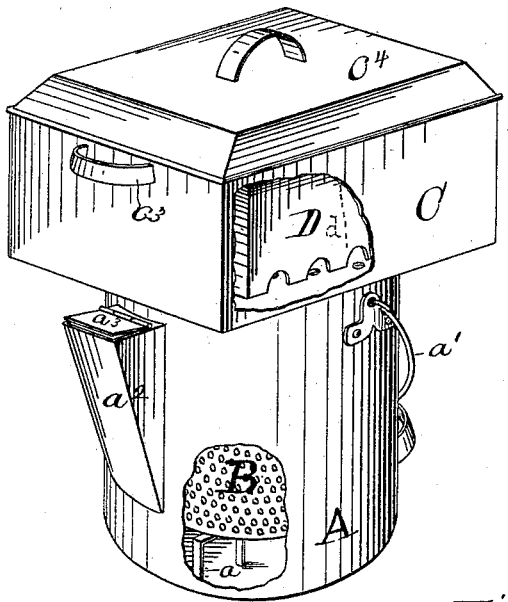
Figure 2:
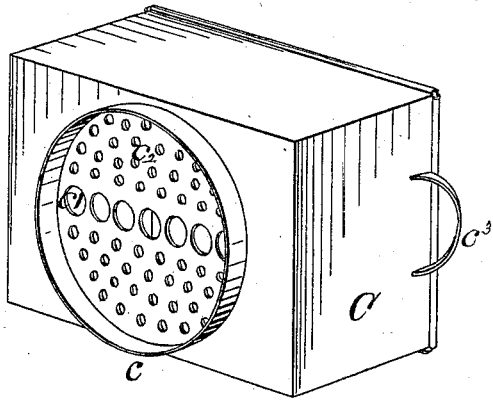
Figure 3:
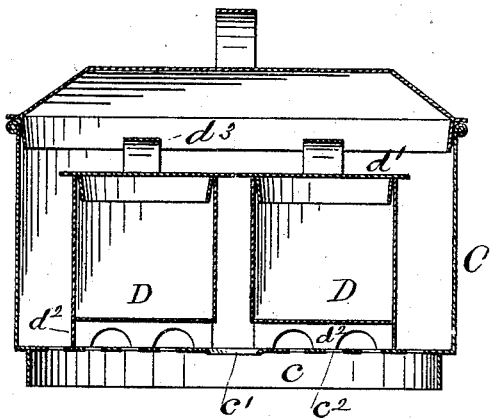

Figure 1 is a perspective of a steamer and oven embodying my invention, portions of the figure being broken away to illustrate to better advantage the internal arrangement and construction of the same; Fig. 2, a perspective of the oven, showing its depending flange and the perforations in the bottom. Fig. 3 is a vertical central section of the oven with the baking-pans therein.

Like letters of reference indicate like parts in all the figures.

A is the water-receptacle, and it is provided with steps $a$, external handle or bail, $a'$, a pouring-spout, $a^2$, having a hinged cover, $a^3$. Within the boiler A, and upon the steps $a$, rests a cylindrical perforated receptacle, B, which I shall denominate the "boiler," and it is provided with an internally-attached bail. (Not shown.)

C represents the oven, and it is provided with a flange, $c$, which adapts it to be set upon the water-receptacle and to fit the same in a steam and water tight manner. Within the flange $c$ the bottom of the oven is perforated, as at $c'$ and $c^2$, the holes $c'$ being centrally or diametrically disposed and larger than the holes $c^2$. The oven is provided with a steam-tight cover, $c^4$, and handles $c^3$. Within the oven are (in this instance two) baking-pans D, divided by partitions $d$ (dotted line, Fig. 1) into two compartments each, and provided with steam-tight covers $d'$ and depending flanges $d^2$ upon three sides, while the fourth side of each pan is without a flange. The flanges $d^2$ are scalloped, as shown. The baking-pans are also provided with handles $d^3$.

The manner of using my invention and its operation are as follows: Sufficient water is put into the receptacle A to cover whatever food it is desired to boil, said food being placed in the boiler B, and into the baking-pans is placed whatever food it is desired to bake, and as the water is heated steam is produced, which rises into the oven mostly at the center thereof and passes between the pans, and these, being placed with their flangeless sides toward each other, the steam passes directly under and between them and is slightly detained there, and less directly passes through the scalloped flanges into the oven, the result being that while boiling one or more dishes or foods in the boiler other separate dishes or foods may be baked in the pans, and that without partaking of the flavor or aroma of the other separate dishes or foods.

The boiler may also be used advantageously in canning fruits in a manner well known to those skilled in that art.

By means of the pouring-spout hot water may be served for the receptacle A, or an additional supply of water may be poured therein to take the place of that which escapes in the form of steam.

Having described my invention, the manner of using, and the operation of the same, what I claim as new, and desire to secure by Letters Patent, is—

The combination of the receptacle A, boiler B, oven C, and pans D, the said oven being provided with a flange, $c$, and perforations $c'$, and the pans having depending flanges $d^2$ on three sides thereof, substantially as shown and described.

In testimony whereof I affix my signature in presence of two witnesses.

OLIVE M. CASSEY.

Witnesses:
NELSON H. BROWN,
F. C. BUCKLER.